(12) United States Patent
Hamacher

(10) Patent No.: US 11,018,558 B2
(45) Date of Patent: May 25, 2021

(54) DRUM MOTOR WITH FREQUENCY CONVERTER AND OPTIONAL BELT TENSION SENSOR

(71) Applicant: INTERROLL HOLDING AG, Sant' Antonino (CH)

(72) Inventor: Stefan Hamacher, Wermelskirchen (DE)

(73) Assignee: INTERROLL HOLDING AG, Sant' Antonino (CH)

(*) Notice: Subject to any disclaimer, the term of this patent is extended or adjusted under 35 U.S.C. 154(b) by 114 days.

(21) Appl. No.: 16/322,524

(22) PCT Filed: Aug. 7, 2017

(86) PCT No.: PCT/EP2017/069977
§ 371 (c)(1),
(2) Date: Feb. 1, 2019

(87) PCT Pub. No.: WO2018/024916
PCT Pub. Date: Feb. 8, 2018

(65) Prior Publication Data
US 2019/0207487 A1 Jul. 4, 2019

(30) Foreign Application Priority Data
Aug. 5, 2016 (DE) .......................... 102016114524.6

(51) Int. Cl.
*H02K 11/00* (2016.01)
*H02K 11/33* (2016.01)
(Continued)

(52) U.S. Cl.
CPC ............. *H02K 11/33* (2016.01); *B65G 23/08* (2013.01); *B65G 43/00* (2013.01); *B65G 43/02* (2013.01);
(Continued)

(58) Field of Classification Search
CPC ...... H02K 11/33; H02K 11/20; H02K 1/2706; H02K 7/116; H02K 11/28; H02K 2207/03;
(Continued)

(56) References Cited

U.S. PATENT DOCUMENTS 5,180,344 A  1/1993 Hall
5,442,248 A  8/1995 Agnoff
(Continued)

FOREIGN PATENT DOCUMENTS

AT  508662  3/2011
AT  13066  5/2013
(Continued)

OTHER PUBLICATIONS

Machine Translation, Reischl, WO-2013000006-A2, Jan. 2013. (Year: 2013).*
(Continued)

*Primary Examiner* — Thomas Truong
(74) *Attorney, Agent, or Firm* — Price Heneveld LLP

(57) ABSTRACT

A drum motor, comprises a drum tube having a cavity formed therein and a longitudinal axis, a shaft, which runs in the longitudinal axis and on which the drum tube is mounted by means of at least one rotary bearing, an electric synchronous drive unit arranged in the cavity of the drum tube, having a stator and a rotor, which are arranged in the longitudinal axis of the drum tube and wherein the rotor is connected to the drum tube and the stator is connected to the shaft, and a control unit for controlling the synchronous drive unit. The control unit of the drum motor has a frequency converter and is fastened directly to the shaft.

32 Claims, 10 Drawing Sheets

(51) Int. Cl.

| | | |
|---|---|---|
| *B65G 23/08* | (2006.01) | |
| *B65G 43/02* | (2006.01) | |
| *H02K 1/27* | (2006.01) | |
| *H02K 7/116* | (2006.01) | |
| *H02K 11/28* | (2016.01) | |
| *B65G 43/00* | (2006.01) | |
| *H02K 11/20* | (2016.01) | |

(52) U.S. Cl.
CPC ............ *H02K 1/2706* (2013.01); *H02K 7/116* (2013.01); *H02K 11/20* (2016.01); *H02K 11/28* (2016.01); *H02K 2207/03* (2013.01)

(58) Field of Classification Search
CPC ........ B65G 43/00; B65G 23/08; B65G 43/02; B65G 2812/02148
USPC .................................................. 310/89, 68 R
See application file for complete search history.

(56) References Cited

U.S. PATENT DOCUMENTS

| | | | |
|---|---|---|---|
| 5,485,590 | A | 1/1996 | Hyatt et al. |
| 5,530,643 | A | 6/1996 | Hodorowski |
| 6,117,318 | A | 9/2000 | Simonelli |
| 6,124,656 | A | 9/2000 | Jensen |
| 6,200,036 | B1 | 3/2001 | Girardey |
| 6,240,335 | B1 | 5/2001 | Wehrung et al. |
| 6,244,427 | B1 | 6/2001 | Syverson |
| 6,633,278 | B1 | 10/2003 | Hoegener et al. |
| 6,672,449 | B2 | 1/2004 | Nakamura et al. |
| 6,701,214 | B1 | 3/2004 | Wielebski et al. |
| 7,207,433 | B2 | 4/2007 | Schaefer |
| 8,006,829 | B2 | 8/2011 | Itoh et al. |
| 8,381,901 | B2 | 2/2013 | Yamamoto |
| 8,757,363 | B2 | 6/2014 | Combs et al. |
| 9,359,142 | B2 | 6/2016 | Jepsen |
| 9,618,056 | B2 | 4/2017 | Itoh |
| 9,731,900 | B2 | 8/2017 | Ruggeri |
| 2002/0010527 | A1 | 1/2002 | Wielebski et al. |
| 2002/0056609 | A1* | 5/2002 | Nakamura ............. B65G 23/08 198/780 |
| 2003/0168316 | A1 | 9/2003 | Knepple et al. |
| 2004/0144623 | A1 | 7/2004 | Newsom et al. |
| 2005/0083188 | A1 | 4/2005 | Choi |
| 2006/0293782 | A1 | 12/2006 | Rees |
| 2007/0024218 | A1 | 2/2007 | Nagai |
| 2007/0197072 | A1 | 6/2007 | Hvidberg et al. |
| 2008/0270427 | A1 | 10/2008 | Franke et al. |
| 2009/0166157 | A1 | 7/2009 | Kratz et al. |
| 2010/0322473 | A1 | 12/2010 | Taylor et al. |
| 2012/0024669 | A1 | 2/2012 | Danelski et al. |
| 2012/0211330 | A1 | 6/2012 | Ziegler |
| 2012/0175223 | A1 | 7/2012 | Breen et al. |
| 2012/0175225 | A1 | 7/2012 | Breen et al. |
| 2012/0259436 | A1 | 10/2012 | Resurreccion et al. |
| 2012/0290126 | A1 | 11/2012 | Combs et al. |
| 2013/0134017 | A1 | 5/2013 | Hall et al. |
| 2013/0190915 | A1 | 7/2013 | Choo et al. |
| 2014/0156063 | A1 | 6/2014 | Neiser et al. |
| 2014/0277698 | A1 | 9/2014 | Combs et al. |
| 2014/0326582 | A1 | 11/2014 | Sakaguchi |
| 2015/0068874 | A1 | 3/2015 | Jepsen et al. |
| 2015/0151921 | A1 | 6/2015 | Collot |
| 2015/0210480 | A1 | 7/2015 | Lindemann |
| 2016/0080526 | A1 | 3/2016 | Meyer-Graefe |
| 2016/0318714 | A1 | 11/2016 | Reischl |
| 2018/0009607 | A1 | 1/2018 | Tiedemann |

FOREIGN PATENT DOCUMENTS

| | | | |
|---|---|---|---|
| CN | 2033808 U | 3/1989 | |
| CN | 2199164 Y | 5/1995 | |
| CN | 203682423 U | 7/2014 | |
| DE | 1978258 | 2/1968 | |
| DE | 3538173 | 1/1987 | |
| DE | 4230729 | 3/1993 | |
| DE | 69306884 | 5/1997 | |
| DE | 19811130 | 9/1999 | |
| DE | 102006004421 | 8/2006 | |
| DE | 102006004421 A1 * | 8/2006 | ............ B65G 39/02 |
| DE | 102006054575 | 9/2008 | |
| DE | 102008053557 | 9/2009 | |
| DE | 102008018205 | 12/2009 | |
| DE | 202008017534 | 12/2009 | |
| DE | 202009012821 | 2/2011 | |
| DE | 202009012822 | 2/2011 | |
| DE | 202012000793 | 4/2012 | |
| DE | 102010044027 | 5/2012 | |
| DE | 102011004802 | 8/2012 | |
| DE | 102011109531 | 2/2013 | |
| DE | 102015106026 | 8/2016 | |
| DE | 102015104130 | 9/2016 | |
| DE | 102015106034 | 10/2016 | |
| DE | 102015106024 | 11/2016 | |
| DE | 102015107167 | 11/2016 | |
| DE | 102015114030 | 3/2017 | |
| EP | 1021664 | 1/2002 | |
| EP | 1454851 | 9/2004 | |
| EP | 1656312 | 5/2006 | |
| EP | 1675244 | 6/2006 | |
| EP | 2369211 | 9/2011 | |
| EP | 2455310 | 5/2012 | |
| EP | 3212543 A1 | 9/2017 | |
| JP | S5741821 | 3/1982 | |
| JP | S5890447 | 5/1983 | |
| JP | S59180609 | 10/1984 | |
| JP | 60-15308 | 1/1985 | |
| JP | S6015308 | 1/1985 | |
| JP | 61-76040 | 4/1986 | |
| JP | H05236612 | 9/1993 | |
| JP | 08-54690 | 3/1996 | |
| JP | 2001101632 | 4/2001 | |
| JP | 2001261145 | 9/2001 | |
| JP | 2003026603 | 1/2003 | |
| JP | 2003104534 | 4/2003 | |
| JP | 2004098554 | 4/2004 | |
| JP | 3123044 | 7/2006 | |
| JP | 2007502599 | 2/2007 | |
| JP | 2007068393 | 3/2007 | |
| JP | 2007528832 | 10/2007 | |
| JP | 2009059890 | 3/2009 | |
| JP | 2009240077 | 10/2009 | |
| JP | 2011088733 | 5/2011 | |
| JP | 2013116795 | 6/2013 | |
| JP | 2014516895 | 7/2014 | |
| JP | 2014142740 | 8/2014 | |
| JP | 2015528429 | 9/2015 | |
| JP | 2017516435 | 6/2017 | |
| WO | 0203153 | 1/2002 | |
| WO | 02098768 | 5/2002 | |
| WO | 2004107531 | 12/2004 | |
| WO | 2005090208 | 9/2005 | |
| WO | 2010142029 | 12/2010 | |
| WO | 2011029120 | 3/2011 | |
| WO | 2012094690 | 7/2012 | |
| WO | 2012113922 | 8/2012 | |
| WO | 2012154650 | 11/2012 | |
| WO | 2012175193 | 12/2012 | |
| WO | 2013000006 | 1/2013 | |
| WO | 2013000006 A2 | 1/2013 | |
| WO | WO-2013000006 A2 * | 1/2013 | ............ H02K 5/225 |
| WO | 2014011459 | 1/2014 | |
| WO | 2014057984 | 4/2014 | |
| WO | 2016066495 A1 | 5/2016 | |
| WO | 2016169982 | 10/2016 | |
| WO | 2016169986 | 10/2016 | |
| WO | 2016177906 | 10/2016 | |

(56) References Cited

FOREIGN PATENT DOCUMENTS

| | | |
|---|---|---|
| WO | 2014178399 | 2/2017 |
| WO | 2018009607 A1 | 1/2018 |

OTHER PUBLICATIONS

Machine Translation, Halme, DE-102006004421-A1, Aug. 2006. (Year: 2006).*

* cited by examiner

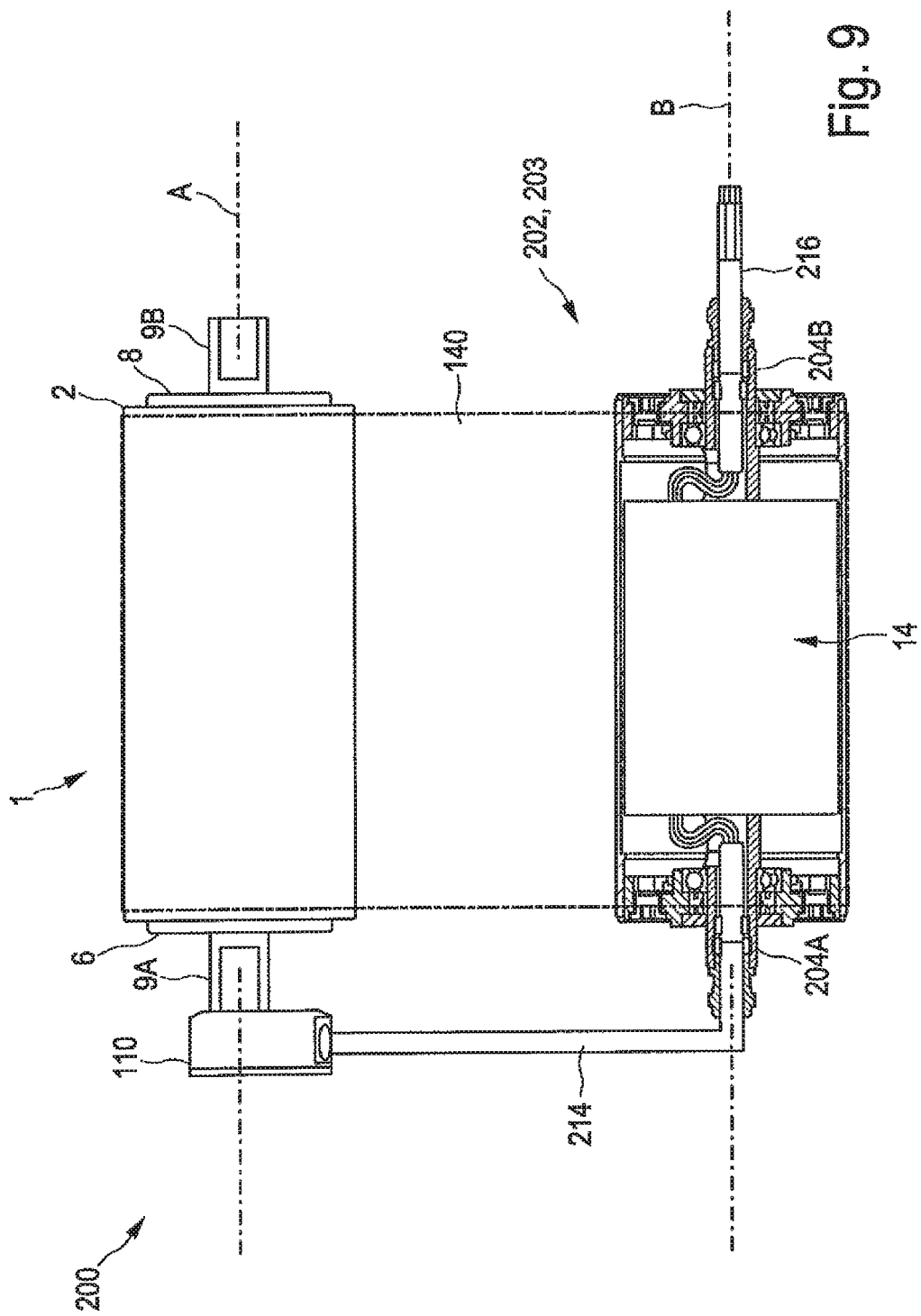

DRUM MOTOR WITH FREQUENCY CONVERTER AND OPTIONAL BELT TENSION SENSOR

CROSS-REFERENCE TO FOREIGN PRIORITY DOCUMENT

The present invention claims the benefit under 35 U.S.C. §§ 119(b), 119(e), 120, and/or 365(c) of PCT/EP2017/069977 filed Aug. 7, 2017, which claims priority to German Application No. 102016114524.6 filed Aug. 5, 2016.

FIELD OF THE INVENTION

The invention relates to a drum motor, comprising a drum tube having a cavity formed therein and a longitudinal axis, a shaft, which runs in the longitudinal axis, and on which the drum tube is mounted by means of at least one rotary bearing, an electric drive unit, in particular, a synchronous or asynchronous drive unit arranged in the cavity of the drum tube, the drive unit having a stator and a rotor arranged in the longitudinal axis of the drum tube, wherein the rotor, which is embodied either as an outer rotor or as an inner rotor, is connected to the drum tube and the stator is connected to the shaft, and comprising a control unit for controlling the drive unit.

Further aspects of the invention are a system, comprising a drum motor of the type mentioned above, a roller apparatus, and a belt, which loops around the drum motor and the roller apparatus, and a method.

BACKGROUND OF THE INVENTION

Drum motors of the type mentioned above are used for various purposes. A key application of such drum motors are relatively large and small logistics units or conveyor apparatuses, in which such drum motors are used as elements of drift conveyors together with idling rollers or driven rollers, which are driven by the drum motor by means of chains, belts, or the like, are set in rotation. Drum motors of this kind can also be referred to as motor-operated conveyor rollers. In this case, the rollers are arranged one behind the other and form a conveyor path. When a drum motor serves as a drive element for belt conveyors and has a higher power class for this purpose, said drum motor can, where applicable, have an internal cooling system by way of a liquid and a higher load level of the gearing compared to drum motors or motor-operated conveyor rollers used for other purposes.

Drum motors of the type described at the beginning basically consist of an electric drive unit in the interior of the drum tube, which drive unit sets the drum tube in rotation with respect to a shaft, which serves as an axle. In this case, the shaft is typically held in a support frame in a manner fixed with respect to location and torque. Said shaft may be continuous or of two-part form such that it forms two axle stubs projecting axially out of the drum tube.

In the case of drum motors that are driven using an electric synchronous drive unit, that is to say, a synchronous electric motor or a synchronous motor, there is also the problem of rotational speed regulation. Synchronous motors can be used effectively as actuators on account of the cogging torque and the positioning by way of the geometrically set permanent magnets, but synchronous motors have to be operated using a frequency converter in order to make it possible to start up the synchronous motor. Previous drum motors having synchronous machines were, therefore, limited in use and it was necessary for operators of conveyor installations having synchronous motors to provide frequency converters at a corresponding central energy supply of the drum motors.

In the case of drum motors that are driven using an electric asynchronous drive unit, that is to say, an asynchronous electric motor or an asynchronous motor, there is also the problem of rotational speed regulation when the rotational speed of the drive unit is intended to be varied. Asynchronous motors can be operated in star or delta connection but, after start-up of the motor, a rotational speed that is dependent on the grid frequency and the number of poles of the motor results. Rotational speed adjustment generally takes place by way of a gear arranged between the motor rotor and the outer drum tube. When the rotational speed is intended to be varied during operation, an asynchronous drive unit also has to be operated using a frequency converter. Previous drum motors having asynchronous machines were, therefore, limited in use and it was necessary for operators of conveyor installations having asynchronous motors to provide frequency converters at an appropriate central energy supply of the drum motors when the rotational speed during operation is intended to be varied.

Drum motors for the mentioned purpose are products that are subjected to various high demands. Highly smooth running is demanded to keep the noise level low in conveyor apparatuses, which typically have a plurality of such drum motors. A cost-effective production method is furthermore demanded since products that can be used in high quantities are involved here. The lifetime of such drum motors is also an important factor. Drum motors are typically serviced at predetermined intervals aligned with the number of rotations and with the load of the corresponding drum motor. If a drum motor is not serviced or if it malfunctions on account of other overloads, the transport installations come to a standstill, which leads to delays in production and delivery. The malfunction of a drum motor can thus also involve great disadvantages and subsequent damage. It is, therefore, necessary to prevent overloading of the drum motor as far as possible and to achieve a high lifetime.

To prevent a malfunction of the drum motor, it is known, for example from DE 10 2006 033 821, to identify a firmly braked state of the drum motor by way of a suitable detection means and accordingly to restrict the energy required for operation of the drum motor. This prevents the drum motor from being operated further in the firmly braked state and from being damaged as a result thereof.

DE 42 30 729 furthermore discloses a drum motor in which a coupling is provided in the interior, which coupling is designed in a manner corresponding to a torque support, and is provided with a switching element so that the drum motor is automatically switched off in the case of a torque that exceeds a threshold value torque. The motor disclosed in DE 4 230 729 serves as a drive for shutters, roller doors, blinds and the like.

WO 02/098768 furthermore discloses a drum motor having an integrated sensor system. The integrated sensor system can have, for example, an inductive sensor, a capacitive sensor, an optical sensor, a vibration sensor, a piezo sensor, a microwave sensor, or a radar sensor. Overall, the integrated sensor system serves to detect the material to be conveyed by means of the drum motor and to measure transport paths.

WO 2010/142029 moreover discloses a system for monitoring a multiplicity of drum motors in a conveyor installation. To this end, a plurality of roller monitors are used for each roller and a remote monitor for monitoring from a remote location. The current consumed by the drum motors is monitored by means of the monitors and processed using a processor. The transmission between the roller monitors and the remote monitor takes place by means of an ad-hoc wireless connection.

Even when the mentioned systems are functioning effectively in principle, there is still a need for further improvement. In particular, it is an object of the present invention to specify a drum motor of the type mentioned at the beginning, in which the lifetime is extended and/or a malfunction of the drum motor on account of overloading can be prevented and the use of which is simplified for an operator.

One problem that arises in this respect in drum motors is that cabling leading to the outside is damaged. In the field of logistics, a multiplicity of moved goods and conveyor units are present. In the event of a collision with a cable serving to supply power to the drum motor, said cable can be damaged slightly, which then involves a malfunction of the drum motor and, in the worst case, leads to a standstill of the conveyor installation. A further problem in long cables is also leakage currents and radio interference.

SUMMARY OF THE INVENTION

In a first aspect, the invention achieves the object in a drum motor of the type mentioned at the beginning by virtue of the control unit having a frequency converter and being fastened directly to the shaft.

In accordance with the invention, provision is made for the control unit, which has a frequency converter for the drive, in particular, a synchronous drive or asynchronous drive, of the drum motor, to be fastened directly to the shaft of the drum motor. As a result thereof, it is possible to provide the frequency converter with the greatest spatial proximity to and directly adjacent to the belt correspondingly led around the drum motor. An operator, therefore, immediately identifies that the drum motor is operated using frequency converters independently of whether a synchronous machine or an asynchronous machine is involved. The operator also immediately identifies how to actuate, handle, and service a drum motor of this kind. The frequency converter is adapted to the type of drive unit of the drum motor and the drive unit is provided, parameterized and distributed together with the frequency converter as one unit. It is now no longer necessary for an operator to supply, install, and parameterize separate frequency converters. This also substantially prevents faulty operation. Since the control unit having the frequency converter is fastened directly to the shaft, an operator is prevented from connecting the synchronous drive unit without a frequency converter to the normal grid (AC voltage grid or three-phase grid) and hence from causing overheating and damage to the synchronous drive unit.

In a first variant, the control unit is fastened to the shaft outside of the drum tube. The shaft is usually held on both sides of the drum tube in corresponding recesses, which are provided on a support frame. The shaft can be continuous or of multi-part form, that is to say, it can extend as one piece through the entire drum motor or the shaft extends on both sides out of the drum tube and forms axle stubs. These axle stubs preferably extend axially toward the outside at the corresponding recesses on a support frame in order to hold the drum motor and, in accordance with this variant, the control unit is fastened to such an axial end, which projects axially toward the outside out of the corresponding shaft recesses. The power supply of the drive unit is preferably provided by means of a cable, which runs in a cavity through the shaft. The shaft is consequently designed as a hollow shaft at least at the side at which the control unit is arranged. There is, therefore, no outwardly running cabling, and the drum tube, shaft, drive unit, and control unit form a single physical unit, which can be assembled as one component in the corresponding support frame. This significantly simplifies the use of the drum motor.

In a second variant, the control unit is held inside the cavity of the drum tube and fastened to the shaft. This further improves the compactness of the drum motor. The control unit including frequency converter is held in the drum tube; a supply of power can again take place by means of a cable fed through the shaft. The cable can then from the outside of the support frame through the shaft into the interior of the drum tube and be connected thereto the control unit and the frequency converter. If the drum motor is designed as an oil-cooled drum motor, it is important in this variant that the control unit including the frequency converter is housed in the drum tube in a manner encapsulated with respect to the oil. For example, a housing or a dry encapsulated region inside the drum tube can be provided for this purpose. In the case of dry-running drum motors, there is no greater problem here. In this way, the frequency converter is preferably arranged in an axially separate housing in the drum tube and, in particular, a cooling system or cooling ribs are provided in order to ensure a transport of heat from the frequency converter toward the outside of the drum tube and to decouple the drive unit and the frequency converter as far as possible from mutual thermal influence.

In a particularly preferred embodiment, the control unit has a controller, in particular, a programmable logic controller for capturing operating data of the drum motor. The programmable logic controller (PLC) can also be used to transmit specific actuating signals to the synchronous drive unit in order to thus achieve a corresponding actuation of a transport belt, for example, during manufacture of goods.

The PLC preferably serves to determine at least one of the following parameters: rotational speed of the rotor, temperature of motor windings, emergency rated current consumption, drum rotations until the next due service, remaining run time until the next due service. The "next due service" is preferably defined by a predetermined threshold value number of revolutions and/or by a predetermined threshold value operating period. If at least one of the two (the threshold value revolution number or the threshold value operating hours number) has been reached, the next service is due. In the case of a synchronous drive unit, the rotational speed, on account of the defined rotation between the rotor and the stator, in which no slip is provided, can be read out from the frequency converter by means of the PLC. If the threshold value rotational speed is stored simultaneously in the PLC, the remaining number of revolutions can be output. The same applies for the operating hours. It is also possible to determine an approximate value for the time period until the next due service from the previous revolutions per operating hour and the average operating hours per day. This is preferably executed by the PLC. To this end, a corresponding computer program code is provided in the PLC or the controller.

Furthermore, it is preferable for the control unit to have a communication unit for wireless or wired transmission of at least one signal. The mentioned parameters are also preferably transmitted separately or together. For example, for threshold value rotational speed a corresponding signal is transmitted wirelessly to a monitoring station in a warehouse or to a mobile device such as, for example, a laptop, smartphone, or the like, so that an employee identifies which drum motor should be submitted for a service. The same applies, for example, for the rated current consumption. This significantly simplifies fault identification, and the employee identifies immediately the location at which there is a need for countermeasures. It is also conceivable for this information to be transmitted to the manufacturer of the drum motor via the internet in order to thus be able to perform particular services. For wireless communication, communication via the Bluetooth® standard is expedient, in particular, as well as via a wireless network, such as WiFi, in particular.

It is further preferable for the control unit to have a display for displaying at least one piece of information relating to the drum motor. For this purpose, a digital display is expedient, for example, which displays the still remaining revolutions until the next service or else the estimated time period determined in advance until the next service, in particular, until the next planned service or standstill of the installation in which the drum motor is operated, in the case of an average load, as occurred, for example, in the previous five working days, ten working days, or the like. Further information, such as, generally, the temperature or the present number of revolutions, rated current consumption and the like can also be displayed.

With a sensorlessly vector-regulated frequency converter installed in or on the drum motor, it is also possible to generate a digital encoder signal, which can be used in a superordinate controller, for example, for tracking a product lying on the conveyor belt. An expensive and sensitive encoder can be replaced by the signal ascertained without a sensor by the frequency converter. This, in turn, offers more operational reliability since the sensitive electronic encoders often malfunction and the drum motor then has to be repaired in a costly manner.

In a further preferred embodiment, or a separate aspect of the invention, provision is made for the drum motor to have a detection device having a force measurement unit for determining a force acting substantially perpendicularly on the longitudinal axis and applied to the drum tube. The force, or a vector representing the force, forms a plane together with the longitudinal axis of the drum motor. The force acts substantially perpendicularly on the surface of the drum tube. In this way, a force that acts on the drum tube on account of a belt tension can preferably be determined. If the drum motor is installed in a system, a belt that partly loops round the drum motor and thus causes a tensile force on the drum motor generally runs, wherein the tensile force acts substantially perpendicularly on the longitudinal axis and is applied to the drum tube. Said force can be determined discretely or continuously by means of the detection device according to the invention, which has a force measurement unit.

It should be understood that such a detection device can also be used in drum motors having asynchronous drives and, therefore, separate protection can be claimed for this aspect, independently of the control unit described above having a frequency converter.

It has been shown that, in particular, the load on account of a belt tension leads to wear on the drum motor. If a large load is transported on a belt that is tensioned around a drum motor, a large force acts on the rotary bearing of the drum motor and this causes a threat of premature wear. In addition, given a high load, there is a threat of oil escaping, which can have negative effects not just in the food industry. If said force acting substantially perpendicularly on the longitudinal axis and applied to the drum tube, in particular, on account of the belt tension, is known, it is possible to select service intervals accordingly and to service the drum motor in good time before it is damaged.

The rotor of the drive unit can surround the stator radially outwardly, that is to say, it can be designed as an outer rotor. As an alternative, it is also possible for the rotor to be designed as an inner rotor and to be coupled, for example, by means of a gear to the drum motor. In such a case, it is expedient not to form the shaft as continuous but to provide two shafts, which serve as axle stubs. The control unit serves to control the drive unit and supplies electrical energy to the drive unit. In relatively large installations, the control unit can be designed as a central control unit, which controls all the drum motors of the installation. As an alternative, the drum motor is provided with a single, separate control unit, which supplies energy to the drum motors according to the conveying requirements. Said drum motor generally has a chip, which regulates the switch-on and switch-off of a current feed.

In accordance with a first preferred embodiment, the force measurement unit has at least one sensor and an evaluation unit, wherein the evaluation unit is configured to determine the force based on a signal received by the sensor and, when the determined force exceeds a prescribed threshold value, to output an overload signal. To this end, the threshold value is preferably stored in the memory in the evaluation unit. The evaluation unit is configured to carry out a comparison operation, in which the determined force is compared with the prescribed stored threshold value. If this comparison operation ascertains that the determined force exceeds the prescribed threshold value, a specific overload signal is output by the evaluation unit. The overload signal is preferably output to the control unit. As an alternative, the overload signal is output to another external unit. In a preferred variant, provision is made for the drum motor to also have a warning light and for the overload signal to be output to the warning light so that, for example, a red light lights up in the case of overload. As a result thereof, it is easy for an operator to identify whether a drum motor is overloaded and appropriate countermeasures can be introduced. Overloading of the drum motor generally leads to increased wear and hence to a significantly decreasing lifetime such that the lifetime of the drum motor is significantly increased thereby. The overload signal can also preferably be output acoustically. The threshold value can preferably be adjusted or is stored at the factory when the installation is installed. The threshold value is dependent on the type of drum motor, on acceptable service intervals, the conventional load during operation of an installation, and on the design of the rotary bearings and of the drum motor. It is also conceivable for the threshold value to be dependent on the temperature, in particular, when this influences a viscosity of a lubricant in the rotary bearings such that provision can be made for the threshold value to be adapted with the temperature.

In a further preferred embodiment, provision is made for the evaluation unit to transmit the overload signal to the control unit and for the control unit to be configured to slow the drum motor upon reception of the overload signal. The drum motor is preferably completely stopped upon reception of the overload signal. This prevents the drum motor from rotating further and thus wearing excessively in the case of overload. Instead, the drum motor is stopped in the case of overload, and an operator can change the load of the drum motor, for example, by manually displacing an object to be transported or other suitable measures. To this end, the control unit preferably transmits a corresponding signal to the chip, which controls the current feed to the drive unit.

In a preferred development of the drum motor, provision is made for the shaft at at least one axial end of the drum tube to be held in a shaft receptacle to support the drum motor. Such a shaft receptacle is preferably provided on both sides in order to support the drum motor accordingly equally.

In a preferred development of the invention, the force measurement unit is configured to determine a force acting on the shaft receptacle from the shaft. Said force is the force acting substantially perpendicularly on the longitudinal axis of the drum motor since it acts directly on the shaft receptacle too. By determining the force acting on the shaft receptacle, it is possible to determine the force applied substantially perpendicularly on the longitudinal axis and a drum tube. To this end, in a simple variant, a flat force sensor such as a strain gauge can be provided.

The detection device is preferably arranged by means of a housing on the side of the shaft receptacle that faces away from the drum tube. The shaft preferably extends through the shaft receptacle into the housing of the detection device. The detection device is preferably connected fixedly to the shaft receptacle by means of the housing, for example, that is flanged thereto. The housing serves not only to hold the detection device, but also to seal off the detection device from environmental influences, such as oil or water, in particular. It is important that the detection device is protected against such influences since it contains electronic components.

Arranging the detection device by means of a housing on the side of the shaft receptacle that faces away from the drum tube also has the advantage that the detection device is easily accessible from the outside, for example, for adjustments, but can also be coupled to a power supply and other peripheral devices in a simple manner.

In a preferred variant, the detection device is arranged inside the cavity of the drum tube. In this variant, the detection device is preferably also provided with a casing, for example, a housing. As an alternative, the detection device is arranged in a sealed-off region inside the drum tube so that it does not come into contact with oil or the like, or with other substances that are transported by means of the drum motor. This also increases the lifetime of the drum motor.

In one configuration of the invention, the shaft is mounted in the shaft receptacle in a displaceable manner against one or more springs and the force measurement unit is configured to determine the force based on a displacement of the shaft. The spring is preferably designed as a compression spring. The spring has a spring constant C and the force acting on the shaft receptacle from the shaft is proportional to the distance by which the shaft is displaced. This results in the spring law $F=C \cdot X$, wherein C is the spring constant and X is the displacement distance. To this end, the shaft receptacle preferably has a slot for receiving the shaft, wherein the slot is aligned with its longitudinal axis parallel to the direction of action of the force to be determined. As an alternative, the end of the shaft is held in a rotationally fixed manner in a separate element, which for its part is held in a displaceable manner in the shaft receptacle. If the force that is to be determined is that force caused by a belt tension, the slot is preferably aligned horizontally in the shaft receptacle. The slot can be open toward one or both sides, wherein at least one stop is provided for the shaft receptacle when it is in a rest position. This variant, which such a displacement ability is possible in both shaft receptacles so that the drum motor is always displaced in an aligned manner and is not twisted around an axis, which is perpendicular to the plane spanned by the longitudinal axis of the drum motor and the force to be determined, is preferred. Twisting of the drum motor around the longitudinal axis thereof leads to the belt surrounding said drum motor to no longer run uniformly, which can likewise be disadvantageous for the lifetime. A uniform displacement of the drum motor is, therefore, preferred in order to ensure the synchronous movement of the belt.

In a first preferred variant, in this case the sensor is designed as a contact switch, and the overload signal is output upon contact between the contact switch and the shaft or an intermediate element coupled to the shaft, such as a shaft holding part. The contact switch is arranged locally in the detection device in such a way that the distance between a rest position of the shaft and the contact switch multiplied by the spring constant corresponds to the threshold value force. In this context, the contact switch is designed as an end switch. If contact between the shaft or an intermediate element and the contact switch is detected, the contact switch outputs an overload signal. Provision can also be made for the contact switch to establish, or interrupt, a current contact. It is likewise conceivable for further transmission means to be provided between the contact switch and the shaft, such as, for example, a lever, a shaft holding part, or the like, so that it is not necessary for the contact switch to come into direct contact with the shaft. Instead, indirect contact is sufficient. If two shaft receptacles are present, it is preferred for two contact switches to be provided as well. In this case, it would suffice when one of the two contact switches is contacted by the shaft in order to output the overload signal.

One variant that is improved compared with this consists in the sensor comprising an encoder and a scale, wherein the encoder is configured to output a signal corresponding to a relative displacement between the encoder and the scale. The scale is preferably arranged on the shaft and the encoder is arranged in the detection device in a locationally fixed manner. In this case, the scale is displaced relative to the encoder. The scale can have, for example, a bar code or the like, and the encoder can be an optical encoder. It is likewise conceivable for the scale to comprise a magnetizable scale, and the encoder to have a magnetized detector. The encoder and the scale are known distance measurement means and in this case further variants are likewise conceivable. This variant has the advantage that the distance can be measured continuously and hence the threshold value force can also be programmed freely by virtue of the overload signal being output by the encoder from a specific distance, that is to say, from a predetermined relative displacement between the encoder and the scale. In this variant, the drum motor in accordance with the present invention can be easily adapted to various operational environments and boundary conditions and the use is, therefore, possible in a flexible manner.

In a further preferred variant, the sensor comprises a potentiometer, which is configured to output an electrical signal that is proportional to a displacement of the shaft. A potentiometer is a simple and robust component, which can be built into the drum motors of the present kind in an advantageous manner. A potentiometer outputs an electrical signal, which corresponds to a displacement, and the evaluation unit compares said signal with a prescribed threshold value signal, which is freely programmable. The prescribed threshold value signal then corresponds to the prescribed threshold value force since the signal output by the potentiometer is proportional to the distance. As already mentioned, the distance is proportional to the force acting perpendicularly on the longitudinal axis of the drum motor and applied to the drum tube. In this variant, too, the threshold value force can be prescribed freely and the drum motor can thus be used in a flexible manner in various application cases. In the preceding embodiments, the sensor is preferably designed so that not only a single overload signal but also a pre-overload signal can be output. That is to say, an overload signal that does not yet involve switching off or slowing the drive but involves a pre-warning stage when there is a threat of overload. In such a case, it is conceivable for a yellow light to be used or for only an acoustic signal to be output. This can be triggered, for example, by way of a second contact switch, which is located, based on the distance, upstream of the contact switch that triggers the overload signal. In the embodiments with encoders or potentiometers, this can be triggered by way of program technology.

In accordance with a further preferred embodiment, the detection device is further configured to determine at least one of the following parameters: rotational speed of the rotor, temperature of motor windings, rated current consumption, drum rotations until the next due service, number of output ballast signals, and date of the output of the overload signal. In particular, the rotational speed of the rotor, the temperature of motor windings, and the number of output overload signals can also be used to determine a service time period until the next service. Given a high rotational speed and a high number of output overload signals, it is probable that the wear is relatively high and the next due service needs to be carried out soon. How many drum revolutions until the next service is due is conventionally prescribed so that it is advantageous when the detection device counts the drum revolutions and, therefore, also detects the drum revolutions still remaining until the next due service. The date or the dates on which an overload signal was output is preferably also detected by the detection device. For this, the detection device or the control unit preferably has a date counter, which can be adjusted by a service employee. It is thus possible to retrospectively take into account the days on which and how often an overload signal was output. For the parameters of the rotational speed of the rotor, the temperature of motor windings, and the rated current consumption, separate sensors are preferably provided, as are known in principle in the prior art.

It is further preferred for the communication unit to be provided for wireless or wired transmission of at least one signal, which represents the determined force. For example, when the overload signal is output, a corresponding signal is transmitted wirelessly to a monitoring station in a warehouse so that an employee identifies the location in the warehouse or logistics installation at which a drum motor has output an overload signal. This significantly simplifies fault identification and the employee identifies immediately the location at which there is a need for countermeasures. It is also conceivable for this information to be transmitted to the manufacturer of the drum motor via the internet in order to thus be able to perform particular services. For wireless communication, communication via the Bluetooth® standard is expedient, in particular, as well as via a wireless network, such as WiFi, in particular.

In accordance with a further preferred embodiment, the control unit has an energy store for supplying electrical energy to the controller and/or to the detection device. This is particularly preferred when the control unit has a communication unit and the controller has a date counter, which are also then intended to be supplied with electrical energy when the drum motor is basically switched off. Such an energy store can be designed as a capacitive store or else comprise a rechargeable battery.

The presence of an overload signal, or else the force acting perpendicularly on the longitudinal axis of the drum tube and applied to the drum tube, is preferably also displayed on the display.

In accordance with a second aspect of the invention, the object mentioned at the beginning is achieved by way of a system, which has at least one drum motor as described above, a roller apparatus, and a belt, which loops around the drum motor and the roller apparatus, wherein the roller apparatus and the drum motor are arranged substantially parallel to one another by way of their axes of rotation. In one variant, the roller apparatus is likewise designed as a drum motor; in another variant, it is designed as a passive roller apparatus. The system can furthermore have a plurality of drum motors and a plurality of roller apparatuses, passive or active. The belt loops around the rollers in such a way that it can serve as a transport belt, wherein the axes are arranged substantially parallel to one another and are preferably aligned in a horizontal plane.

In accordance with a third aspect of the invention, the object mentioned at the beginning is achieved by way of a system, comprising at least one drum motor having a drum tube having a cavity formed therein and a longitudinal axis, a shaft, which runs in the longitudinal axis and on which the drum tube is mounted by means of at least one rotary bearing, an electric drive unit arranged in the cavity of the drum tube, having a stator and a rotor, which are arranged in the longitudinal axis of the drum tube, and the drive unit generates a rotational movement of the drum tube relative to the shaft, in particular, by virtue of the rotor being connected to the drum motor and the shaft, and a control unit for controlling the drive unit; comprising a roller apparatus, in particular, a deflection drum, wherein the drum motor and the roller apparatus are arranged substantially parallel to one another by way of their axes of rotation, wherein the roller apparatus has a roller tube having a roller cavity formed therein and a longitudinal axis, and a roller shaft, which runs in the longitudinal axis and on which the roller tube is mounted by means of at least one roller rotary bearing; and comprising a belt, which loops around the drum motor and the roller apparatus; wherein the control unit has a frequency converter and is fastened directly to the roller shaft.

Deviating from the drum motor in accordance with the first aspect of the invention, in accordance with said third aspect of the invention, provision is made for the control unit not to be fastened to the shaft of the drum motor but to the roller shaft of the roller apparatus. The roller apparatus is preferably designed as a deflection drum, which is conventionally provided in a conveyor installation for deflecting the belt. Such deflection drums are not driven by a separate drive but instead concomitantly run passively via the belt. Cabling of the control unit to the drive unit can then be led, for example, out of the shaft of the drum motor, along an edge of the conveyor installation in which the drum motor and the roller apparatus are arranged and then to the control unit. The cabling is thus led completely close to the structure or along the structure and substantially protected against collision with moving objects.

The control unit can be positioned in this way on a roller apparatus that is easily accessible for service employees or that is climatically well suited for positioning sensitive electronic components on account of the position thereof. Furthermore, in accordance with this aspect of the invention, the control unit can be protected better and easier against oil and liquid, which can conventionally be used for lubrication and cleaning. Nevertheless, said control unit is close to the drum motor and short cable routing can be achieved. It is not necessary to lead a cable to a switchgear cabinet or the like located remotely. Leakage currents and radio interference can be substantially prevented.

The control unit and the positioning thereof with respect to the roller apparatus in accordance with the third aspect of the invention has identical and similar embodiments and developments to the control unit and the positioning thereof with respect to the drum motor in accordance with the first aspect of the invention. Said embodiments and developments are laid down, in particular, as described herein. In this respect, for further features and the advantages thereof, reference is made fully of the above description with respect to the first aspect of the invention.

In a first variant, the control unit is fastened to the roller shaft outside of the roller tube. The roller shaft is usually held on both sides of the roller tube in corresponding recesses, which are provided on a support frame or framework. The roller shaft can be continuous or of multi-part form, that is to say, it can extend as a full axle through the entire roller apparatus or the roller shaft extends on both sides out of the roller tube and forms two axle stubs. These axle stubs preferably extend axially toward the outside to the corresponding recesses on a support frame in order to hold the roller apparatus. In accordance with this variant, the control unit is fastened to such an axial end, which projects axially out of the corresponding shaft recesses.

In a second variant, the control unit is held inside the roller cavity of the roller tube and fastened to the roller shaft. This further improves the compactness of the roller apparatus and, therefore, of the system overall. The control unit including the frequency converter is held in the roller tube; a power supply can take place by means of a cable fed through the roller shaft. The cable can then from outside of the support frame through the roller shaft into the interior of the roller tube and be connected there to the control unit and the frequency converter. This variant has the advantage that the control unit can be protected particularly effectively. In particular, it is possible to achieve protection of the control unit up to IP66 or IP69K.

In accordance with a fourth aspect of the invention, the object mentioned at the beginning is achieved by way of a method for operating a transport system having a drum motor having a drum tube, a roller apparatus, wherein the drum motor and the roller apparatus are arranged substantially parallel to one another by way of their axes of rotation, and a belt, which loops around the drum motor and the roller apparatus, having the following steps: determining a force acting substantially perpendicularly on the longitudinal axis of the drum motor and applied to the drum tube; comparing whether the determined force exceeds a predetermined threshold value force, and outputting an overload signal when the determined force exceeds the threshold value force. Preferably, the transport system is a system in accordance with the second aspect of the invention, and/or the drum motor is a drum motor in accordance with one of the embodiments described above of a drum motor in accordance with the first aspect of the invention. It should be understood that the drum motor in accordance with the first aspect of the invention, the system in accordance with the second aspect of the invention and the method in accordance with the third aspect of the invention have identical and similar embodiments, as are laid down, in particular, as described herein. In this respect, reference is made fully to the above description.

The method also preferably comprises the following steps: receiving the overload signal at a control unit; and slowing, in particular, stopping, the drum motor when the overload signal is received.

In a fifth aspect of the invention, the object mentioned at the beginning is achieved by way of a method for operating a transport system having a drum motor having a drum tube, a roller apparatus, wherein the drum motor and the roller apparatus are arranged substantially parallel to one another by way of their axes of rotation, and a belt, which loops around the drum motor and the roller apparatus, having the following steps: identifying the drum revolutions; and determining the number of drum revolutions until the next service. Said method is preferably executed using a drum motor having a synchronous drive unit or an asynchronous drive unit. The drum motor is, therefore, preferably a drum motor in accordance with the first aspect of the invention described at the beginning. The frequency converter in a synchronous drive unit can be used as a "sensorless" encoder and the rotational speed is known on account of the control of the drum motor by means of the frequency converter. A service is due after a specific threshold value rotational speed has been reached and a remaining rotational speed until the next due service can be determined from the known predetermined threshold rotational speed and from the known detected present rotational speed. The method furthermore preferably comprises the following step: identifying a remaining time until the next service. This step preferably comprises a counting of the previous operating hours and a determination of the average operating hours per day, and determining therefrom the expected number of days and hours until the next due service, which is characterized by a threshold value operating hours number. The method furthermore preferably comprises the following step: identifying a rated current consumption, a winding temperature, a rotor rotational speed, and an automatic recognition, the drum motor being subjected to the usage type thereof. The method furthermore preferably comprises: switching off the motor after a limit value has been reached. A limit value can be a threshold value of one of the aforementioned parameters, for example, a limit value of the winding temperature or of the motor rated current. This further improves the safety of the drum motor.

BRIEF DESCRIPTION OF THE DRAWINGS

The invention is explained in more detail below with reference to the appended figures, in which:

FIG. 9 is a schematic view of a system, wherein the control unit is fastened directly to the roller shaft of a deflection roller.

DETAILED DESCRIPTION OF THE EMBODIMENTS

Figure 1:
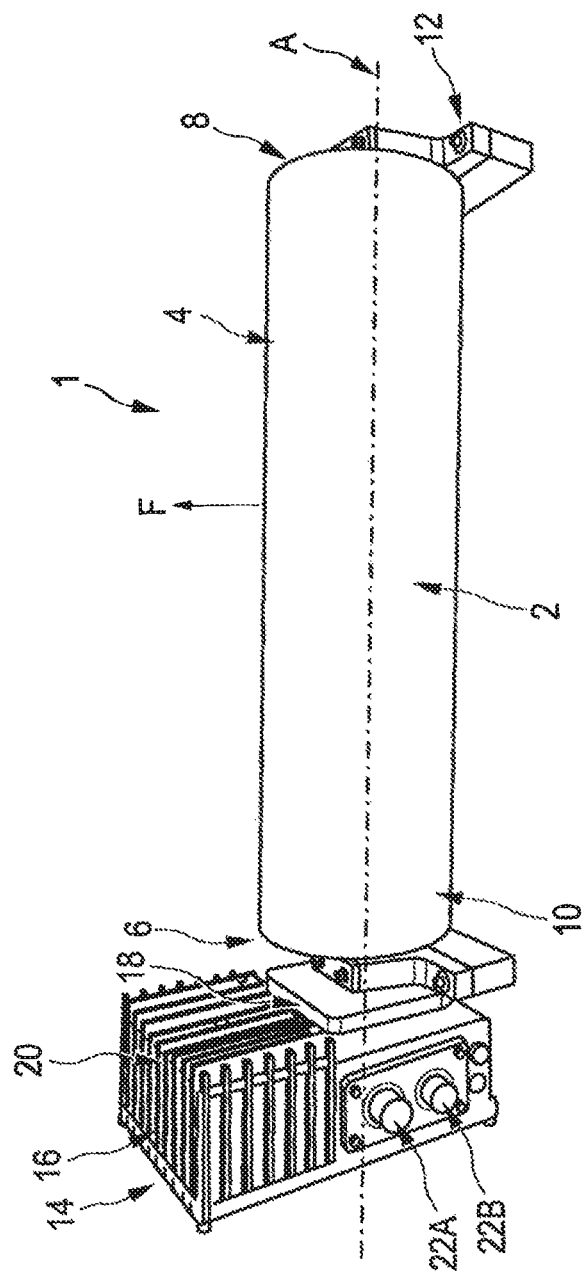
FIG. 1 is a perspective side view of a drum motor in accordance with the invention.

A drum motor 1 in accordance with the present invention has a drum tube 2, which has a cavity formed therein. The cavity cannot be seen in the Figures; reference is made in this respect to the general design of known drum motors. The drum motor 1 also has a longitudinal axis A, which is the longitudinal axis of the drum tube 2 and represents the axis of rotation of the drum motor at the same time.

An electric synchronous drive unit (not illustrated) is housed inside the drum tube 2 (cf. FIG. 4) and has a stator and a rotor for rotationally driving the drum tube 2. The drum tube 2 serves to hold on its outer face 4 a belt 140 (cf. FIG. 6), which is part of a transport system. The belt 140 extends in the assembled state with respect to FIG. 1 approximately in the plane of the drawing.

Two respective shafts 9A, 9B (not visible in FIGS. 1 and 2; cf. FIG. 3) are provided at both axial ends 6, 8 of the drum tube 2. The two shafts 9A, 9B serve as axle stubs and are held in a rotationally fixed manner in corresponding shaft receptacles 10, 12. The shaft receptacles 10, 12 can be provided on the drum motor 1 separately here; they can likewise be part of a machine support frame, which serves as a support frame for a transport system having a plurality of drum motors 1 and/or other rollers.

On the left in FIG. 1, a control unit 14 is illustrated arranged next to the shaft receptacle 10 and on the side facing away from the drum tube 2. More specifically, the housing 16 of the control unit 14 can be seen, which housing 16 is flanged to the shaft receptacle 10 by means of an intermediate plate 18. The housing 16 is provided with a multiplicity of cooling ribs 20 in order to cool the electronics system housed therein. Two control buttons 22A, 22B are provided on the side of the housing 16 facing toward the viewer in FIG. 1, by means of which control buttons the control unit 14 can be operated.

Figure 3:
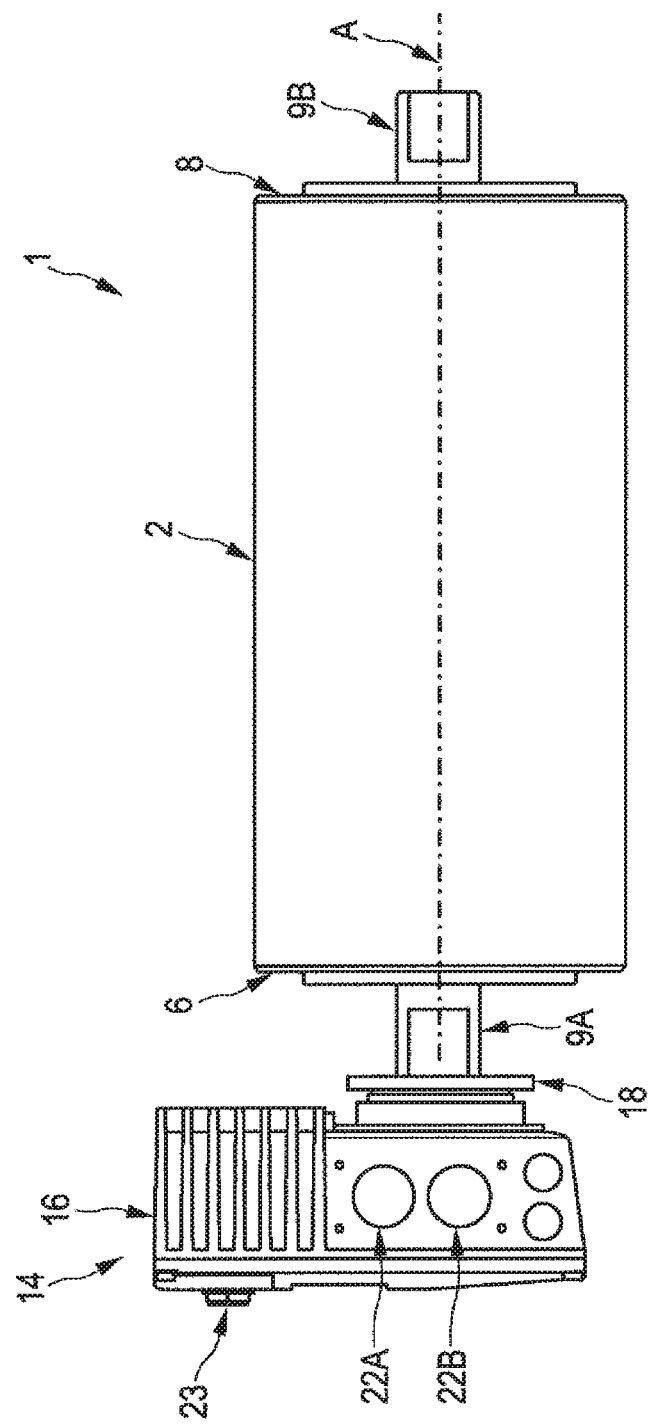
FIG. 3 is a schematic side view of the drum motor from FIGS. 1 and 2.
Figure 4:
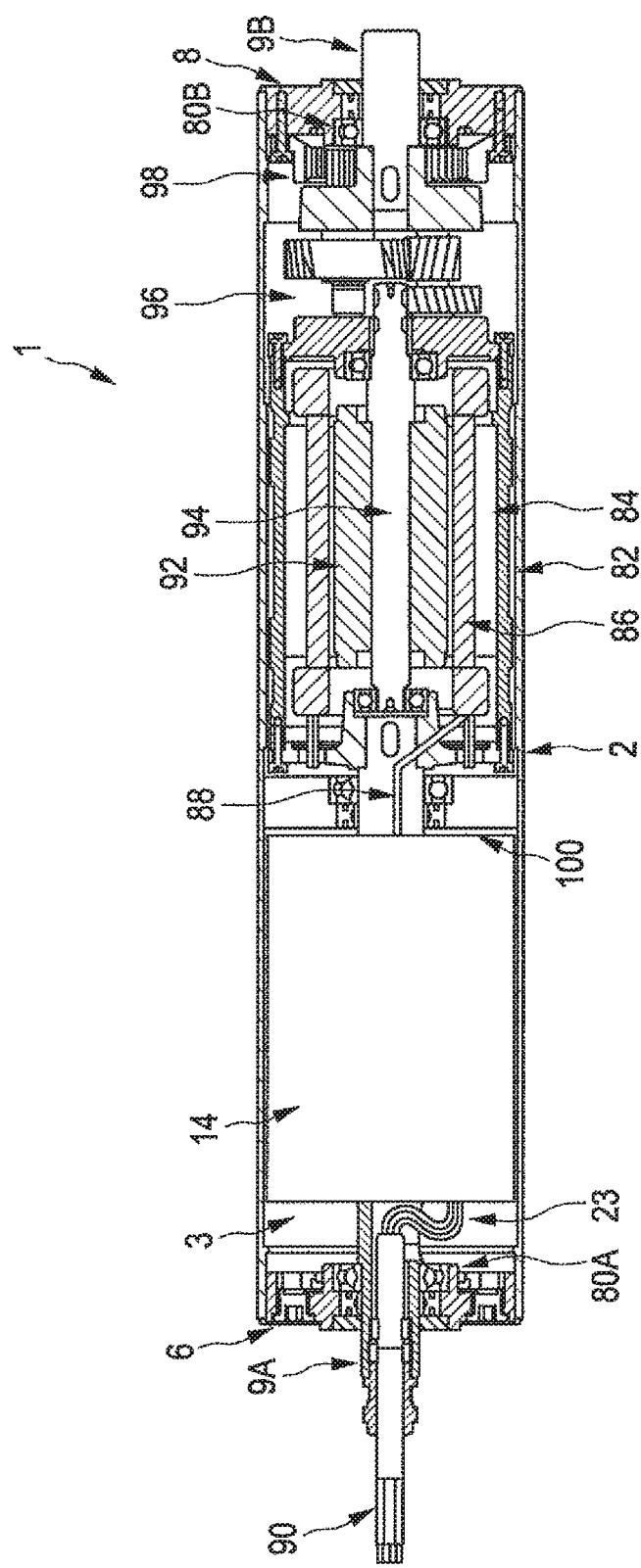
FIG. 4 is a full section through a drum motor in accordance with a second exemplary embodiment.

The control unit 14 has a frequency converter in the interior, which is connected to the synchronous or asynchronous drive unit (cf. FIG. 4). The frequency converter and the control unit 14 are mounted directly on the shaft 9A by means of the housing 16. The intermediate plate 18 serves as a stop for the shaft receptacle 10 (cf. FIGS. 1 and 2), which is not shown in FIG. 3 for the sake of clarity. FIG. 3 shows particularly well how the two shafts 9A, 9B project out of the drum 2 so that the drum motor 1 as illustrated in FIG. 3 can be held in a corresponding support frame as one physical unit. A grid connection at the control unit 14 is denoted by 23. The control unit 14 can be connected directly to the AC or three-phase grid, and the drum motor 1 can thus be operated directly without an operator having to install an additional frequency converter or the like. In this exemplary embodiment, the control unit is coupled fixedly and rigidly to the shaft 9A so that the drum motor 1 is pre-assembled overall as a physical unit.

The frequency converter makes it possible to adjust rotational speeds smoothly from almost zero up to rated rotational speed without the torque of the drum motor dropping. However, the drum motor can also be operated above the rated rotational frequency, but the output torque then decreases since the voltage can no longer be adapted to the increased frequency; unless operation takes place with an expanded Hz characteristic curve to expand the voltage adjusting range, rotational speeds at double the rated rotational speed at a constant torque are then possible, but the drum motor has to be dimensioned with a sufficient power reserve for this.

The connection between the control unit 14 and the synchronous or asynchronous drive unit (cf. FIG. 4) in the interior of the drum tube 2 takes place by means of a cable connection, which runs in the interior of the shaft 9A (cf. likewise FIG. 4 correspondingly). The control unit 14 also has a programmable logic controller (PLC). It should be understood that the PLC can also be designed as a controller or a microcomputer, but a PLC is more cost-effective and more robust and is, therefore, preferred. The rotational speed of the rotor of the synchronous drive unit and thereby also the drum 2, the rated current, and the winding temperature can be identified by means of the PLC in the control unit 14. In accordance with this exemplary embodiment, the PLC also has a date counter. In order to supply the date counter permanently with a certain power, the control unit 14 furthermore has an energy store, which is designed in this exemplary embodiment as a capacitor or buffer-storage battery/rechargeable battery. As a result, the PLC including the date counter can also be operated in a state in which the drum motor 1 is not connected to the grid.

The date counter is used to store time points at which overloading or the like, such as overheating, occur. To this end, the control unit 14 also has an internal memory, for example a RAM memory or EPROM, and a communication unit for transmitting said information via radio. The control unit 14 can thus operate as a "sensorless" encoder since no additional sensor is required to detect the rotation of the drum tube 2, but this can be read out from the frequency converter. The design is also significantly simplified thereby.

Figure 2:
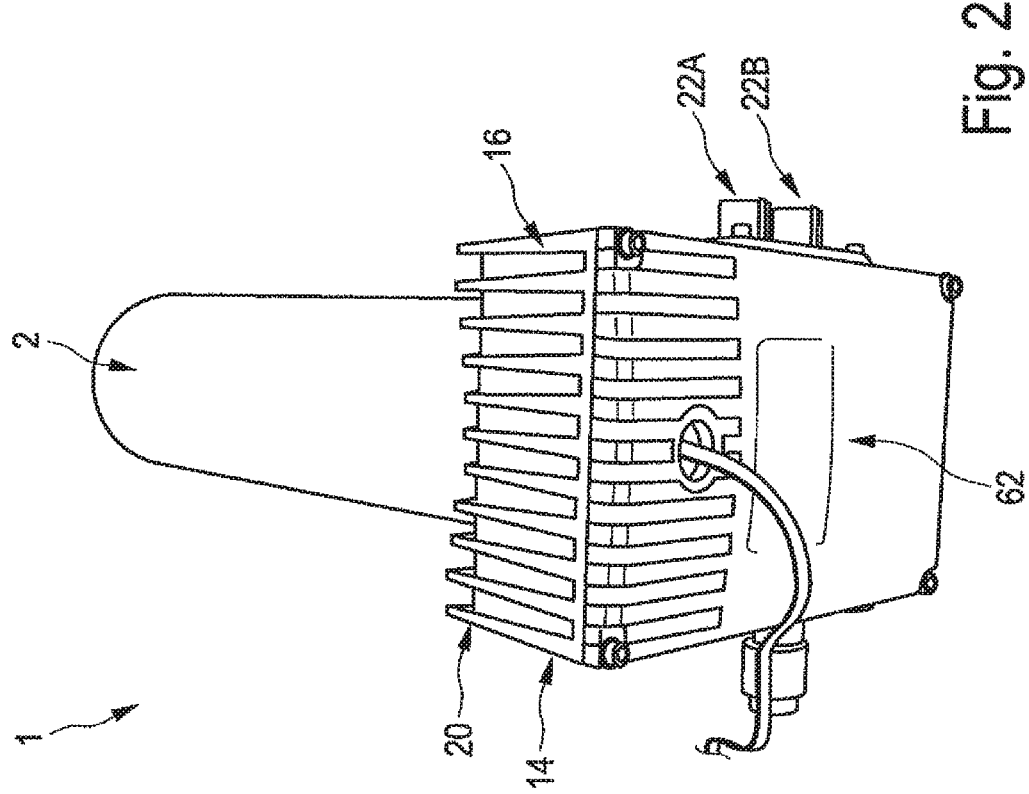
FIG. 2 is a further perspective side view of the drum motor from FIG. 1.

FIG. 4 illustrates a variant with respect to FIGS. 1 to 3 that substantially differs therefrom in that the control unit 14 is not fastened to the shaft 9A outside of the drum tube 2, but inside the drum tube 2 in a cavity 3 provided for this.

The general design of the drum motor 1 can also been seen based on FIG. 4. Also in the first exemplary embodiment (FIGS. 1 to 3), the drum motor 1 is designed with the difference that the control unit 14 is arranged outside of the drum tube 2.

The drum tube 2 is mounted on the corresponding shafts 9A, 9B by means of rotary bearings 80A, 80B. The synchronous drive unit 82 is arranged in the interior of the drum tube 2 and is designed as an inner rotor motor. That is to say, the radially outer stator 84 is fixedly coupled to the shaft 9A and has a corresponding stator winding 86. This is supplied with the appropriate electric current by the control unit 14 via the line 88. The control unit 14 is, in turn, connected via a terminal 90, which is led toward the outside through the shaft 9A. The rotor 92 has a rotor shaft 94, which leads into a gear 96. The output side 98 of the gear 96 is connected to the drum 2. The drum tube 2 can be driven as a result thereof.

Since the gear 96 is lubricated with oil, a wall 100 is provided inside the drum tube 2 in order to encapsulate the control unit 14. This protects the control unit 14 against oil and simultaneously thermally decouples same from the drive unit.

The essential advantage of this embodiment (FIG. 4) is that the drum motor 1 corresponds overall in terms of its dimensions to a conventional drum motor having an asynchronous drive unit and can, therefore, be installed in existing installations in a simple manner. The drum motor 1 in accordance with this embodiment can be connected directly to the conventional grid via the terminal 90 since the control unit 14 has a frequency converter and this is connected between the terminal 90 and the synchronous drive unit 82.

In the embodiments of FIGS. 1 to 3, a display 62 is arranged on the housing 16 or an external display can be plugged into the frequency converter by means of a communication interface. The number of revolutions of the drum tube 2 until the next due service is displayed on said display 62.

Such a display 62 is also preferred in the embodiment in accordance with FIG. 4. However, since here the control unit 14 is arranged in the interior of the drum tube 2, the drum motor 1 preferably has a separate display panel 110 (cf. FIG. 5). The display panel 110 is arranged, for example, on the second shaft 9B even when it is likewise possible to arrange it on the shaft 9A.

In accordance with this exemplary embodiment, the display panel 110 has the display 62 and a start button 112, a stop button 114, and further adjusting buttons 16A, 16B, 16C, 16D. An antenna 120 is also provided to transmit the information, in particular, the information displayed on the display 62.

Figure 5:
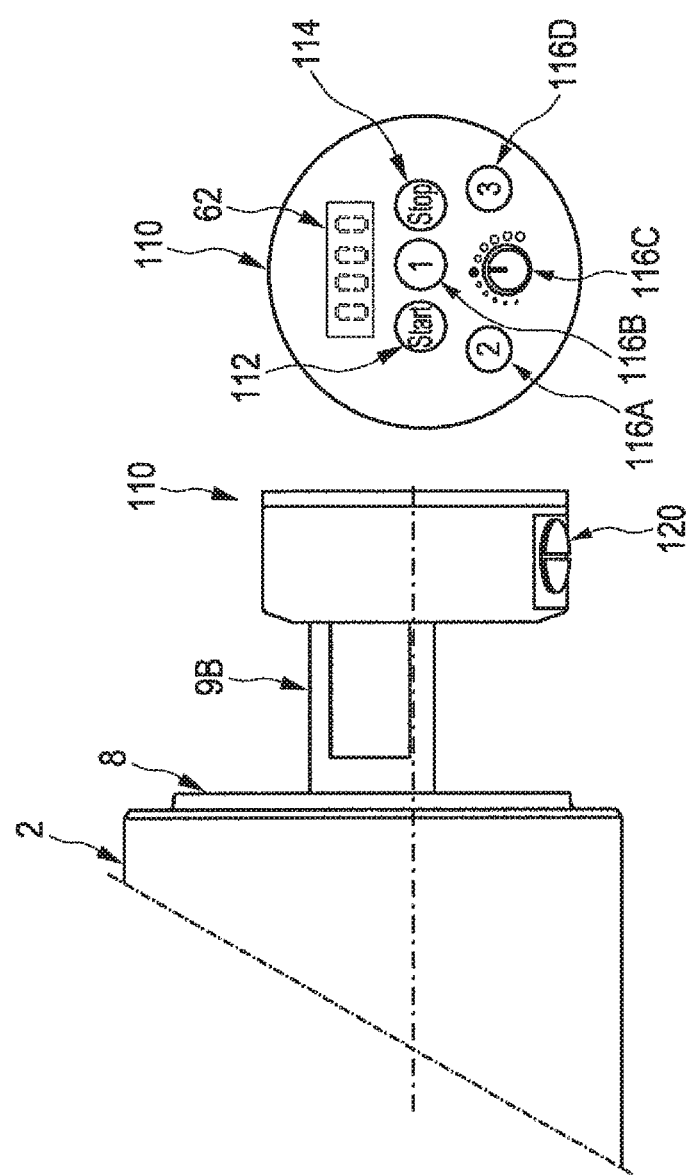
FIG. 5 is a detail and a side view of the drum motor from FIG. 4.

It is also conceivable to lead a second control line from the motor in addition to the power cable for power supply in order to be able to externally connect a control unit having a display thereto. This is necessary, in particular, if the fixedly attached housing as illustrated in FIG. 5 were to make no sense on account of constricted or inaccessible spatial circumstances.

Figure 6:
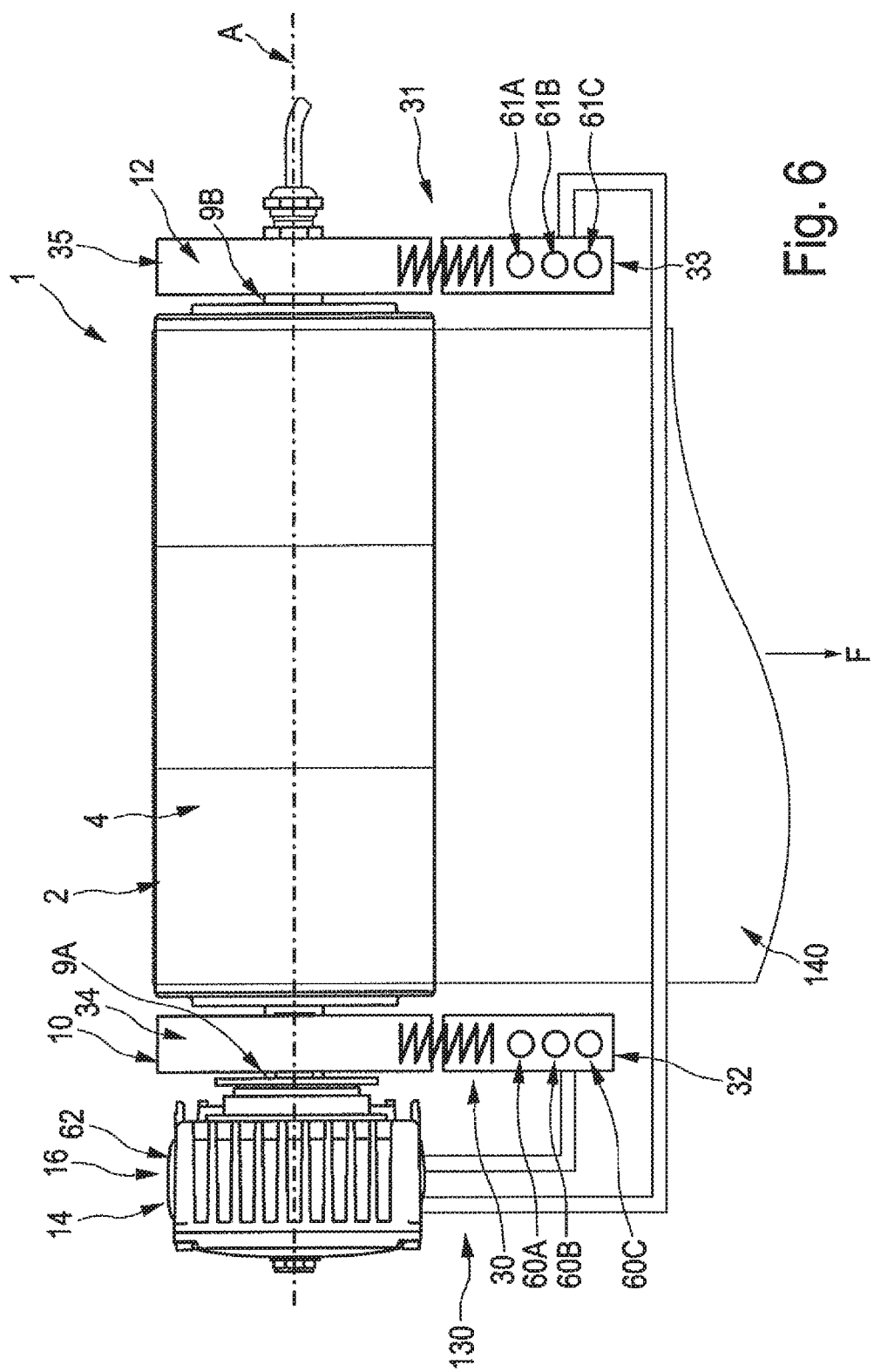
FIG. 6 is a schematic plan view of a drum motor in accordance with a third exemplary embodiment.
Figure 7:
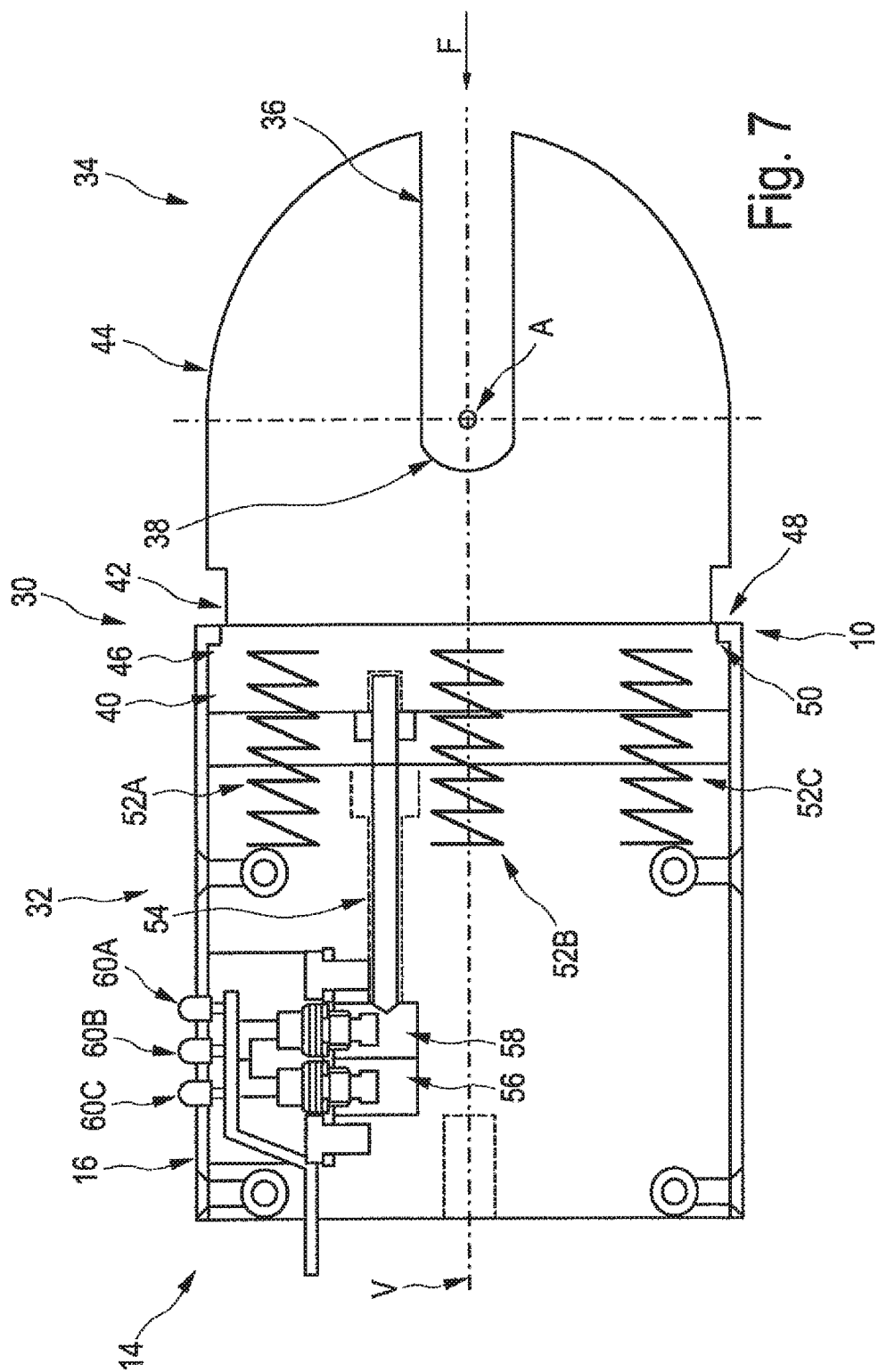
FIG. 7 is a schematic illustration of a shaft receptacle including detection device and force measurement unit.
Figure 8A:
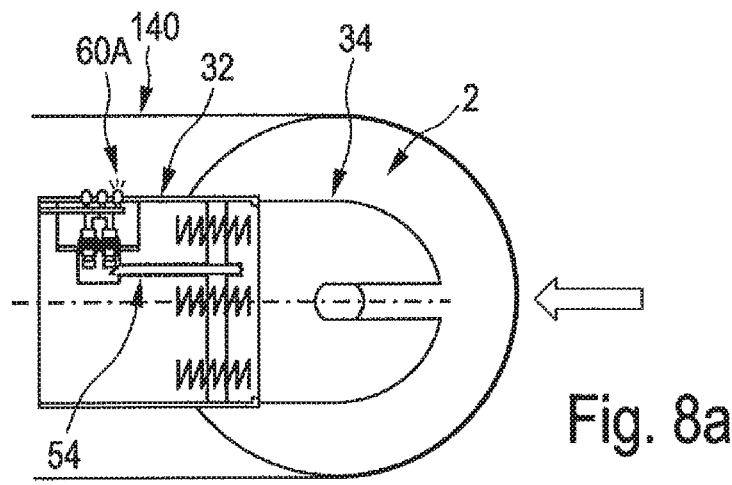
FIGS. 8a, 8b, and 8c are three views of the force measurement unit from FIG. 7 in three different states.
Figure 8B:
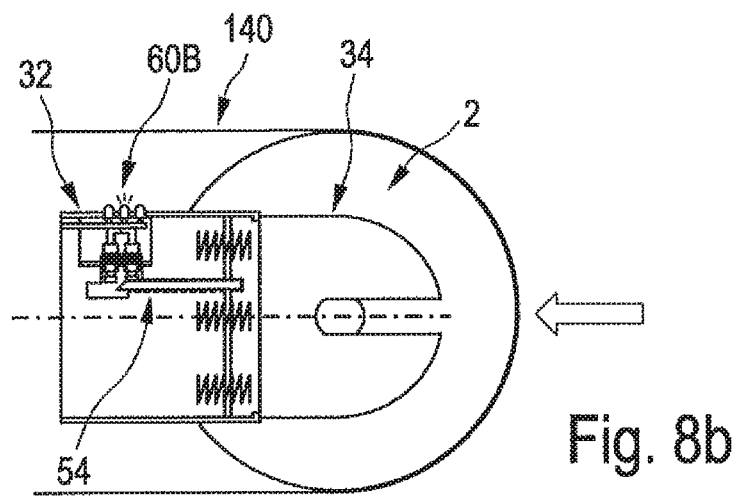
Figure 8C:
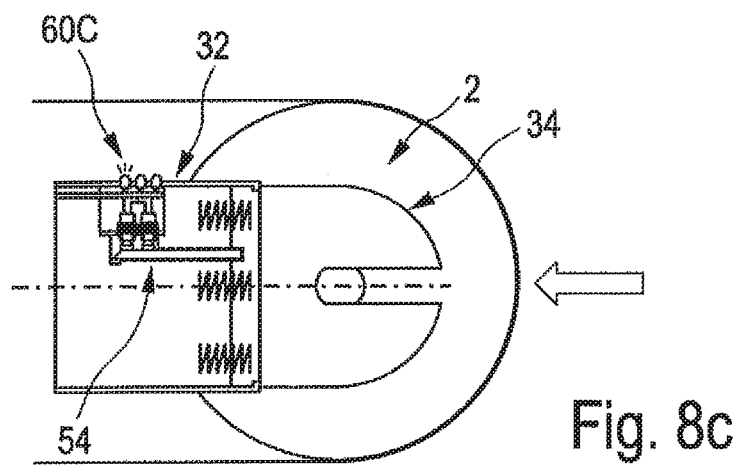

FIGS. 6 to 8c illustrate a further exemplary embodiment of the present invention that is illustrated based on the exemplary embodiment in accordance with FIGS. 1 to 3 for the sake of simplicity. Again, the drum motor 1 has a control unit 14, which is fastened to the shaft 9A outside of the drum tube 2. FIG. 6 illustrates an overview whereas FIGS. 7 to 8d show details. In accordance with FIG. 6, the two shafts 9A, 9B are held in corresponding shaft receptacles 10, 12.

In accordance with this exemplary embodiment, the drum motor 1 is provided with a detection device 130, which is provided in accordance with this exemplary embodiment inside the control unit 14. However, the detection device 130 can likewise be provided as a separate component with a separate housing. This is preferably the case when the drum motor 1 is not provided with a synchronous drive unit but with an asynchronous drive unit operated without a frequency converter and, therefore, the control unit 14 can be omitted. Even in such embodiments, however, a detection device 130 as described hereinafter is preferred.

The detection device 130 has two force measurement units 30, 31, wherein, in other embodiments, only one force measurement unit 30 may also be provided. A force F acting substantially perpendicularly on the longitudinal axis A and applied to the drum tube 2 can be determined by means of the force measurement units 30, 31.

The force F is preferably perpendicular to the surface 4 of the drum tube 2. It is thus perpendicular to the drum tube 2. The force F is caused by a belt 140, which is guided around the drum tube 2 and which serves to transport goods. On account of the gravitational force of the transported goods, the belt 140 is tautened and "pulls" on the drum tube 2 so that the force F is exerted thereon. It has been found that a high load in this direction leads to faster wear of the rotary bearings 80A, 80B for rotationally bearing the drum tube 2 on the shaft 9A, 9B. In order to be able to react in good time here with a corresponding service or a switch-off of the drum motor 1, in accordance with the present invention, the force F is fed through the detection device 130 having the force measurement units 30, 31.

In one variant that is not illustrated, the detection device 130 is arranged in a manner analogous to the above exemplary embodiment of FIG. 4 and in a manner comparable to the control unit 14 inside the drum tube 2. Such an arrangement has the advantage that the installation space is reduced, but this can lead to problems with oil leakage. In such a case, it is, therefore, preferred for the detection device 130 to be housed in an encapsulated region 3 inside the drum tube 2.

The force measurement unit 30, 31 in each case interacts with an end section of the shaft 9A, 9B, which is held in the shaft receptacle 10, 12.

In the exemplary embodiment (FIGS. 6 to 8c) illustrated here, the force measurement unit 30, 31 has a stationary part 32, 33 and a shaft holding part 34, 35. The shaft holding part 34, 35 is formed, in particular, from a metal sheet and has an elongate receptacle 36 (cf. FIG. 7), into which a shaft, namely the shaft 9A at the end 6 of the drum tube 2, can be held up to a stop 38. The shaft 9A can be secured in the receptacle 36 in contact with the stop 38, for example, by way of a clamping screw connection. To this end, it is expedient to provide a thread at the shaft end that extends through the shaft holding part 34 so that the shaft is connected to the shaft holding part 34 in a clamping manner by way of a corresponding nut. In the assembled position, the shaft is arranged in the receptacle 36 so that the longitudinal axis A extends perpendicularly to the plane of the drawing, as shown in FIG. 7.

The shaft holding part 34 has a foot end 40, which is separated from a head part 44 by way of a narrowed region 42. The foot end 40 is widened compared to the narrowed region 42 so that a stop 46 is formed. The foot end 40 is held in the stationary part 32 in a displaceable manner, which stationary part 32 likewise has at the opening a narrowing 48 for holding the shaft holding part 34, which forms a stop 50 corresponding to the stop 46. The shaft holding part 34 is thus prevented from sliding out.

The foot part 40 is pretensioned by means of three helical compression springs 52A, 52B, 52C in the direction toward the right with respect to FIG. 7, that is to say, into a position in which the stops 46, 50 abut one another. This position is also referred to as the rest position. The shaft holding part 34 and, therefore, also the shaft and consequently also the drum tube 2 assume said position in a no-load state.

A sensor actuation element 54 is arranged on the foot part 40 of the shaft holding part 34, which sensor actuation element 54 extends in the direction of the displacement axis V in an elongate manner. In accordance with this embodiment, a first and a second contact switch 56, 58 are arranged laterally adjacent to the sensor actuation element 54. If the force F is now exerted on the drum tube 2 and is transmitted via the shaft and onto the shaft holding part 34, the shaft holding part 34 is displaced, with respect to FIG. 7, to the left against the force of the springs 52A, 52B, 52C (cf. FIGS. 8A, 8B, 8C). Since the distance of the displacement of the shaft holding part 34, that is to say, of the insertion of the foot part 40 into the stationary part 32, is proportional to the force F, it is possible for a force F, with which the sensor actuation element 54 comes into contact with the respective contact switch 56, 58, to be predetermined by way of the spacing between the contact switches 56, 58 and the sensor actuation element 54.

More precisely, in this embodiment, when a force F is applied, the sensor actuation element 54 first comes into contact with the second contact switch 58 and then with the first contact switch 56 when the force F increases further. If the first contact switch 56 is actuated, an overload signal is output. The second contact switch 58 serves as a pre-warning stage that a high force has already been reached. An overload signal is not output here but instead only a pre-load signal is output. The overload signal is output to the control unit 14 and the drum motor 1 is stopped.

In this simple case with the mechanically actuated contact switches 56, 58, the connection of the contact switch of the control 14 serves as an evaluation unit, which is described above and which is configured to determine the force on the basis of the signal received by the contact switches 56, 58 and to output the overload signal when this determined force exceeds the prescribed threshold value.

As furthermore seen from FIGS. 6 to 8c, three LEDs 60A, 60B, 60C, 61A, 61B, 61C are provided at each stationary part 32, 33. LED 60A, 61A is green, LED 60B, 61B is yellow and LED 60C, 61C is red. Said three LEDs 60A, 60B, 60C, 61A, 61B, 61C display the load of the drum motor 1 by means of a traffic light system. In the rest state, LED 60A, 61A lights up (cf. FIG. 8A), and an operator is informed about the fact that the force F is in an acceptable range by way of the display of the green light. In this state, the sensor actuation element 54 has not yet reached the contact switch 58 or has not yet been fully pressed down. If the force F is now increased, the foot part 40 is inserted further into the stationary part 32 and the sensor actuation element 54 comes into contact with the second contact switch 58. If said second contact switch is actuated sufficiently, the yellow contact light 60B, 61B lights up (cf. FIG. 8B). The green contact light 60A goes out at the same time. An operator can thus identify that the force F has now reached a pre-load region, which although it is not yet critical, the force F in this state is still already close to the threshold value force and the drum motor 1 is increasingly loaded.

If the load now increases further and the force F rises accordingly, the foot part 40 is inserted further against the force of the springs 52A, 52B, 52C and the sensor actuation element 54 comes into contact with the first contact switch 56. If said first contact switch is pressed, the red LED 60C, 61C lights up (cf. FIG. 8C). The yellow LED 60B, 61B goes out. An operator can identify here from the red light that this is a warning and the predetermined threshold value force has now been reached. The overload signal is also output simultaneously and the drum motor 1 is slowed, in particular, is stopped. Stopping the drum motor prevents the drum motor 1 from moving further under an overload and, therefore, a failure of the drum motor 1 is prevented.

It can easily be identified that the contact switches 56, 58 can also be replaced by other sensors, such as, in particular, an encoder. In such a case, instead of the two contact switches 56, 58, an individual encoder would be able to be provided and a scale at the sensor actuation element 54. The encoder would in this case scan the scale on the sensor actuation element 54 and, upon a determined counting state that then corresponds to a predetermined insertion of the foot section 40 being reached, would output a corresponding signal.

The scale on the sensor actuation element 54 can be designed in such a case in any desired manner, in particular, can be scanned in an optical, magnetic, or mechanical manner. Corresponding optical, magnetic, or mechanical encoders are known and available.

As a further possibility, there is also the variant of providing a potentiometer instead of the contact switches 56, 58. In this case, a toothed rod, for example, would be provided on the sensor actuation element 54 and a corresponding pinion would be provided on the potentiometer. As an alternative, the sensor actuation element 54 could be designed as a plunger-type iron core, which is inserted into a corresponding plunger-type coil. Insertion of the foot section 40 into the stationary part 32, and thus a displacement of the shaft against the force of the springs 52A, 52B, 52C, can also be detected thereby and an overload signal can be output in the case of corresponding exceedance of a threshold value force.

In the embodiment illustrated (cf. FIG. 6), the display 62 is arranged on the housing 16 of the control unit 14 next to the three LEDs 60A, 60B, 60C, 61A, 61B, 61C. The force F that presently acts on the drum tube 2 is preferably displayed on said display 62 when an encoder or the like, a sensor that permits continuous force measurement is arranged, instead of the contact switches 56, 58. In addition, the number of revolutions of the drum tube 2 until the next due service is displayed on the display 62. To this end, the control unit 14 determines the next due service interval based on the conventional service intervals and the detected load of the drum motor 1, in particular, the number of output overload signals. It is thus conceivable, for example, when detecting a first overload signal, to reduce the number of revolutions until the next service interval by 5%. Appropriate staggering can be provided here.

Figure 10:
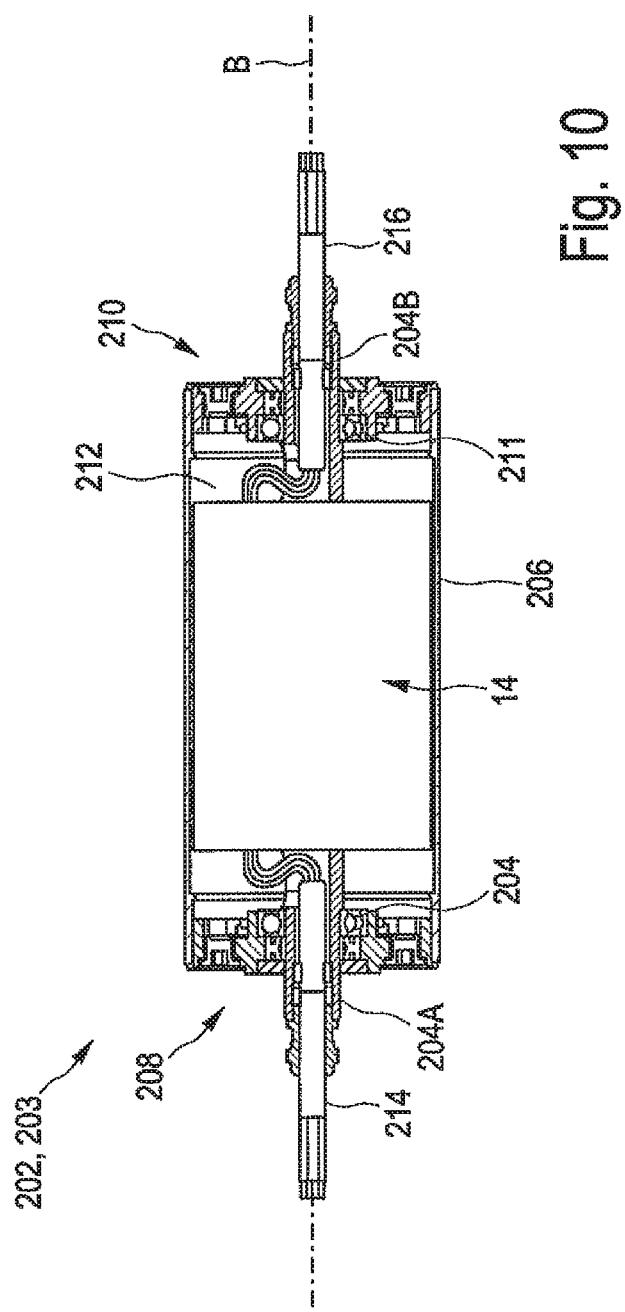
FIG. 10 is a longitudinal section through a deflection roller having a control unit arranged therein.

FIGS. 9 and 10 now illustrate a system comprising at least one drum motor 1 and a roller apparatus 202. Identical and similar elements are provided with identical reference signs to the first exemplary embodiments. In this respect, reference is made fully to the above description.

Deviating from the first exemplary embodiment of the drum motor 1 (cf. FIGS. 1 to 5), in this specific exemplary embodiment of the system 200 (FIGS. 9 and 10), the control unit 14 is not arranged directly on the shaft 9A, 9B of the drum motor 1 but instead is fastened directly to a roller shaft 204A, 204B of the roller apparatus 202.

In this exemplary embodiment, the roller apparatus 202 is designed as a deflection roller 203 and is shown in detail in FIG. 10. The deflection roller 203 has a roller tube 206, on the radially outer surface of which the belt 140 runs. The roller tube 206 is mounted rotatably on the roller shaft 204A, 204B by means of a first bearing cover 208 and a second bearing cover 210, which roller shaft can be held in a support frame in a rotationally fixed manner. To this end, a first roller rotary bearing 209 is provided at the first bearing cover 208 and a second roller rotary bearing 211 is provided at the second bearing cover 210. Specifically, the roller shaft 204A, 204B is divided here and is designed as two axle stubs, which run along the central axis B through the first and second bearing covers 208, 210. In this respect, such roller apparatuses 202 and, in particular, deflection drums 203 are known and are often used.

On account of the bearing covers 208, 210, an inner roller cavity 212 is effectively sealed off against the environment. Roller apparatuses 202 and, in particular, deflection drums 203 are not driven and the cavity 212 is filled only with air during operation.

In this embodiment, the roller cavity 212 is used to house the control unit 14 including frequency converter therein.

In other exemplary embodiments, provision is made for the control unit 14 to be fastened to the roller shaft 204A, 204B outside of the roller tube 206, as has already been described above with reference to the drum motor 1.

As a result of the fact that the control unit 14 is arranged in the roller cavity 212, said control unit is protected particularly effectively against environmental influences and, in particular, it is possible to achieve protection in accordance with class IP66 or IP69K.

In this exemplary embodiment, both the first axle stub 204A and the second axle stub 204B are embodied as hollow so that a first electrical line 214 runs through the first axle stub 204A to the control unit 14. Said first electrical line 214 connects the control unit 14 to the drum motor 1, in the exemplary embodiment shown in FIG. 9 specifically to the display panel 110, which for its part is coupled to the drive unit 82 of the drum motor 1 by means of the axle stub 9A. A second electrical cable 216, which serves to supply electric current to the control unit 14, runs through the second roller axle stub 204B. The control unit 14, which has a frequency converter, then converts the fed energy in order to drive the drive unit 82 accordingly and provides said energy via the first electrical line 214.

The first electrical line 214 preferably runs along a support frame or structure at which both the drive motor 1 and the roller apparatus 202 are held by means of the corresponding shafts or shaft sections 9A, 9B, 204A, 204B.

In this respect, it should be understood that the control unit 14 is likewise rotationally fixed and only the roller tube 206 rotates during operation.

The advantages of the first exemplary embodiment are improved further by way of said system 200. The operator can still read off corresponding values directly at the drum motor and perform adjustments by way of the display panel 110, which is arranged on the drum motor 1. However, the control unit 14 is remote from the drum motor 1 but still arranged in spatial proximity thereto, in particular, on the same structure. In this case, the control unit is protected effectively against external influences and the roller cavity 212 is used expediently.

The invention claimed is:

1. A drum motor, comprising:
a drum tube having a cavity formed therein and a longitudinal axis;
a shaft coincident with the longitudinal axis and on which the drum tube is mounted via at least one rotary bearing;
an electric drive unit arranged in the cavity of the drum tube, the electric drive unit having a stator and a rotor arranged coincident with the longitudinal axis of the drum tube, wherein the rotor is connected to the drum tube and the stator is connected to the shaft; and
a control unit for controlling the drive unit, wherein the control unit has a frequency converter fastened directly to the shaft.

2. The drum motor of claim 1, wherein the electric drive unit is a synchronous drive unit and the control unit for controlling the synchronous drive unit is parameterized.

3. The drum motor of claim 1, wherein the control unit is fastened to the shaft outside of the drum tube.

4. The drum motor of claim 1, wherein the control unit is held inside the cavity of the drum tube and is fastened to the shaft.

5. The drum motor of claim 1, wherein the control unit has a controller for capturing operating data of the drum motor.

6. The drum motor of claim 5, wherein the controller is a programmable logic controller.

7. The drum motor of claim 5, wherein the controller is further configured to determine at least one of the following parameters: rotational speed of the rotor, temperature of motor windings, rated current consumption, drum rotations until the next due service, or remaining run time until the next due service.

8. The drum motor of claim 1, wherein the control unit has a communication unit for wireless or wired transmission of at least one signal.

9. The drum motor of claim 1, wherein the control unit has a display for displaying at least one piece of information relating to the drum motor.

10. The drum motor of claim 1, further comprising a detection device having a force measurement unit for determining a force acting substantially perpendicularly on the longitudinal axis and applied to the drum tube.

11. The drum motor of claim 10, wherein the force measurement unit comprises at least one sensor and an evaluation unit, wherein the evaluation unit is configured to determine the force based on a signal received by the sensor and to output an overload signal when the determined force exceeds a prescribed threshold value.

12. The drum motor of claim 11, wherein the evaluation unit transmits the overload signal to the control unit and the control unit is configured to slow the drum motor upon reception of the overload signal.

13. The drum motor as claimed in claim 11, wherein the sensor is a contact switch and the overload signal is output upon contact between the contact switch and the shaft or an element coupled to the shaft.

14. The drum motor as claimed in claim 11, wherein the sensor comprises an encoder and a scale, and wherein the encoder is configured to output a signal corresponding to a relative displacement between the encoder and the scale.

15. The drum motor as claimed in claim 11, wherein the sensor comprises a potentiometer configured to output an electrical signal that is proportional to a displacement of the shaft.

16. The drum motor of claim 10, wherein the shaft is disposed at at least one axial end of the drum tube and is held in a shaft receptacle to support the drum motor, and wherein the force measurement unit is configured to determine a force acting on the shaft receptacle from the shaft.

17. The drum motor of claim 16, wherein the detection device is arranged within a housing on a side of the shaft receptacle that faces away from the drum tube.

18. The drum motor of claim 16, wherein the detection device is arranged inside the cavity in the drum tube.

19. The drum motor as claimed in claim 16, wherein the shaft is mounted in the shaft receptacle in a displaceable manner against at least one spring and the force measurement unit is configured to determine the force based on a displacement of the shaft.

20. The drum motor as claimed in claim 1, wherein the control unit has an energy store for supplying electrical energy to the controller and/or to a detection device.

21. A transport system comprising at least one drum motor as claimed in claim 1, further comprising:
a roller apparatus, wherein the drum motor and the roller apparatus are arranged substantially parallel to one another by way of their axes of rotation; and
a belt that loops around the drum motor and the roller apparatus.

22. A transport system, comprising:
at least one drum motor having a drum tube having a cavity formed therein and a longitudinal axis, a shaft coincident with the longitudinal axis and on which the drum tube is mounted via at least one rotary bearing, an electric drive unit arranged in the cavity of the drum tube, the electric drive unit having a stator and a rotor arranged in the longitudinal axis of the drum tube and wherein the rotor is connected to the drum tube and the stator is connected to the shaft, and a control unit for controlling the drive unit;
a roller apparatus arranged substantially parallel to the drum motor by way of an axis of rotation of each of the roller apparatus and the drum motor, wherein the roller apparatus further comprises a roller tube having a roller cavity formed therein and a longitudinal axis, and a roller shaft that runs in the longitudinal axis and on which the roller tube is mounted via at least one roller rotary bearing; and
a belt that loops around the drum motor and the roller apparatus, wherein the control unit has a frequency converter and is fastened directly to the roller shaft.

23. The transport system of claim 22, wherein the roller apparatus is a deflection drum.

24. The transport system of claim 22, wherein the electric drive unit is a synchronous drive unit and the control unit for controlling the synchronous drive unit is parameterized.

25. The transport system of claim 22, wherein the control unit is fastened to the roller shaft outside of the roller tube.

26. The transport system of claim 22, wherein the control unit is held inside the roller cavity of the roller tube and fastened to the roller shaft.

27. The transport system of claim 22, wherein the control unit has a controller for capturing operating data of the drum motor.

28. The transport system of claim 27, wherein the controller is a programmable logic controller.

29. The transport system of claim 27, wherein the controller is further configured to determine at least one of the following parameters: rotational speed of the rotor, temperature of motor windings, rated current consumption, drum rotations until the next due service, remaining run time until the next due service.

30. The transport system of claim 22, wherein the control unit has a communication unit for wireless or wired transmission of at least one signal.

31. The transport system of claim 22, wherein the control unit has a display for displaying at least one piece of information relating to the drum motor.

32. The transport system as claimed in claim 22, wherein the control unit has an energy store for supplying electrical energy to a controller.

* * * * *